United States Patent
Liesenfeld et al.

[11] Patent Number: 5,988,014
[45] Date of Patent: *Nov. 23, 1999

[54] SHEET-METAL STEERING WHEEL

[75] Inventors: Udo Liesenfeld, Goldbach; Klaus Drefahl, Hanau; Martin Kreuzer, Kleinwallstadt; Peter Hartmann, Waldaschaff; Heribert Werner, Kahl, all of Germany

[73] Assignee: TRW Automotive Safety Systems GmbH, Aschaffenburg, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/874,552

[22] Filed: Jun. 13, 1997

[30] Foreign Application Priority Data

Jun. 21, 1996 [DE] Germany ............................ 196 24 799
Jun. 9, 1997 [DE] Germany ............................ 197 24 073

[51] Int. Cl.⁶ ...................................................... B62D 1/04
[52] U.S. Cl. ............................................. 74/552; 29/894.1
[58] Field of Search ............................... 74/552; 29/894.1

[56] References Cited

U.S. PATENT DOCUMENTS

| | | | |
|---|---|---|---|
| 1,375,670 | 4/1921 | Bundy ..................................... | 29/894.1 |
| 1,779,219 | 10/1930 | Sheller ................................... | 29/894.1 |
| 1,785,897 | 12/1930 | Geyer ..................................... | 29/894.1 |
| 1,823,562 | 9/1931 | Husted ................................... | 29/894.1 |
| 1,869,267 | 7/1932 | Marbach et al. ....................... | 29/894.1 |
| 1,869,333 | 7/1932 | Bronson et al. ......................... | 74/552 |
| 1,869,334 | 7/1932 | Bronson et al. ....................... | 29/894.1 |
| 1,872,052 | 8/1932 | Wrigley ................................. | 29/894.1 |
| 2,297,137 | 9/1942 | Fennema ................................. | 74/552 |
| 2,425,240 | 8/1947 | George .................................... | 74/552 |
| 3,686,969 | 8/1972 | Siepmann .............................. | 74/552 X |
| 3,714,844 | 2/1973 | Tsuda . | |
| 4,011,645 | 3/1977 | Muller .................................... | 74/552 |
| 4,359,911 | 11/1982 | Eubanks et al. ........................ | 74/552 |
| 4,892,006 | 1/1990 | Endo et al. ............................. | 74/552 |
| 4,976,801 | 12/1990 | Martine et al. ........................ | 29/894.1 |

FOREIGN PATENT DOCUMENTS

| | | | |
|---|---|---|---|
| 512 755 | 1/1921 | France . | |
| 553348 | 5/1923 | France ................................... | 29/894.1 |
| 2496036 | 6/1982 | France .................................... | 74/552 |
| 1981140 | 3/1968 | Germany ................................ | 74/552 |
| 37 19 658 A1 | 1/1988 | Germany ................................ | 74/552 |
| 270890 | 1/1930 | Italy ........................................ | 29/894.1 |
| 4-62272 | 5/1992 | Japan . | |
| 4193681 | 7/1992 | Japan . | |
| 318 680 | 9/1929 | United Kingdom . | |

OTHER PUBLICATIONS

Abstract of the technical paper "Development of Magnesium Steering Wheel", Yoshinari et al., Toyota Motor Corp., Published by Society of Automotive Engineers, Inc, Feb. 25, 1991.

*Primary Examiner*—Vinh T. Luong
*Attorney, Agent, or Firm*—Sprung Kramer Schaefer & Briscoe

[57] ABSTRACT

A steering-wheel skeleton has a hub, spokes, and a rim made in one piece out of a single sheet-metal blank and provided with its final shape by separation and bending without machining. The hub is provided with a cone facing the vehicle. The spokes, which extend up and out, are provided with unthreaded bores, cutouts, or threaded bore for attaching an airbag module. A nut can, if necessary, be forced into one cutout. The hub can be reinforced by using two layers of the material.

9 Claims, 2 Drawing Sheets

SHEET-METAL STEERING WHEEL

BACKGROUND OF THE INVENTION

The present invention concerns a steering-wheel skeleton with a hub, spokes, and a rim.

Steering-wheel skeletons of this type are usually composed of several parts fastened together by rivets, screws, soldering, welding or a combination thereof and then finished by extruding plastic around them or covering them with leather or a similar material. The skeleton constitutes the supporting structure and must be designed strong enough to support the forces exerted on the steering mechanism by the driver. An increasing number of extra functions must also be taken into account when designing such a skeleton. At least both a conveniently accessible mechanism for actuating the horn and an airbag for example must be accommodated in the steering wheel. More and more switches and buttons for various vehicle functions must also be mounted directly on the wheel where the driver can operate them without having to remove his hands from it.

Finally, the steering-wheel skeleton must be designed to ensure passive safety, meaning that it must not cause severe injuries in the event of an accident. For this reason, in particular, contemporary steering wheels are more or less bowl-shaped, with the outer rim toward the driver and the hub farther forward and with the spokes accordingly slanting inward and forward toward the hub.

It should be obvious from the foregoing that all these demands can best be satisfied with a composite steering wheel, allowing all the to some extent opposing requisites to be achieved simultaneously. It is on the other hand always attempted to make manufacture costs as reasonable as possible, which is of increasing significance to traditional automobile manufacturers due to the growth in international competition. There has accordingly been no lack of attempts to construct even such complicated steering wheels of as few parts as possible. Known from U.S. Pat. No. 4,359,911 for example is a steering-wheel skeleton with a central assembly comprising a hub and spokes stamped out of sheet metal and with a separate rim enclosed by and riveted to the ends of the spokes. The central assembly and the rim can be made of different materials, allowing the specific demands made of each part to be complied with independently. Still, the fastening method is comparatively complicated.

Known from German 3 719 658 A1 is a steering wheel made of sheet metal and comprising an outer sheet-metal bowl facing the driver and a force-transmitting sheet-metal bowl fastened behind it with space left between them that comprises the rim. No radial spokes as such are involved, and the overall assembly looks like a disk when viewed head-on. This approach is intended to save weight, simplify manufacture, and improve safety in that the rear bowl can deform and tightly encloses a volume of air up to specific flow cross-sections. The bowls are fastened together air tight along their circumferences, in the vicinity of the rim, that is.

This known steering wheel consists, apart from an insert in the hub, of only two components and is accordingly relatively simple to manufacture. It is, however, not ergonomically satisfactory because the fingers cannot fit very far around the rim. Furthermore, such additional components as switches, buttons, etc. would considerably compromise its tightness. Finally, the purpose of the air-filled interior can today be attained much more effectively with an integrated airbag. An airbag, however, could not be employed in such a wheel without sacrifice to its basic concept.

There is accordingly a need for a steering wheel of the type hereinbefore described that would be even less expensive to manufacture but would not be subject to any limitations in design with respect to the aforesaid demands while still allowing the accommodation of the aforesaid additional functions.

SUMMARY OF THE INVENTION

This object is attained in accordance with the present invention in a one-piece steering-wheel skeleton made of a single sheet-metal blank finished by separating and molding without machining.

The present invention is based on the awareness that a steering-wheel skeleton can be manufactured in one piece including the rim by exploiting the full potential for cutting and punching a sheet-metal blank without or without significant sacrifice of even one requirement with respect to strength, shape, or additional functions. The machining and non-machining shape-providing steps can be mutually adjusted in accordance with the concretely prescribed final shape of the steering-wheel skeleton such that practically any desired final shape can be attained. The sheet need not be too thick and the skeleton need not be left with excess material.

The steering-wheel skeleton obtains its final shape in a practical way by a sequence of several molding steps that are in principle known from the art of sheet-metal working and preferably combined with one or more separating steps. From another aspect of the theory behind the present invention the spokes can be constructed in accordance with the principle of a support of equal transverse strength. It is also possible to utilize cold material fastening in a non-machining molding process accompanied by local material duplication for reinforcement (e.g. for the hub).

Further modifications and embodiments are recited in claims 7 through 10.

BRIEF DESCRIPTION OF THE INVENTION

FIG. 1 is a section through a steering-wheel skeleton 1 in accordance with the present invention and FIG. 2 is a section through one embodiment of a spoke.

DETAILED DESCRIPTION OF THE INVENTION

Figure 1:
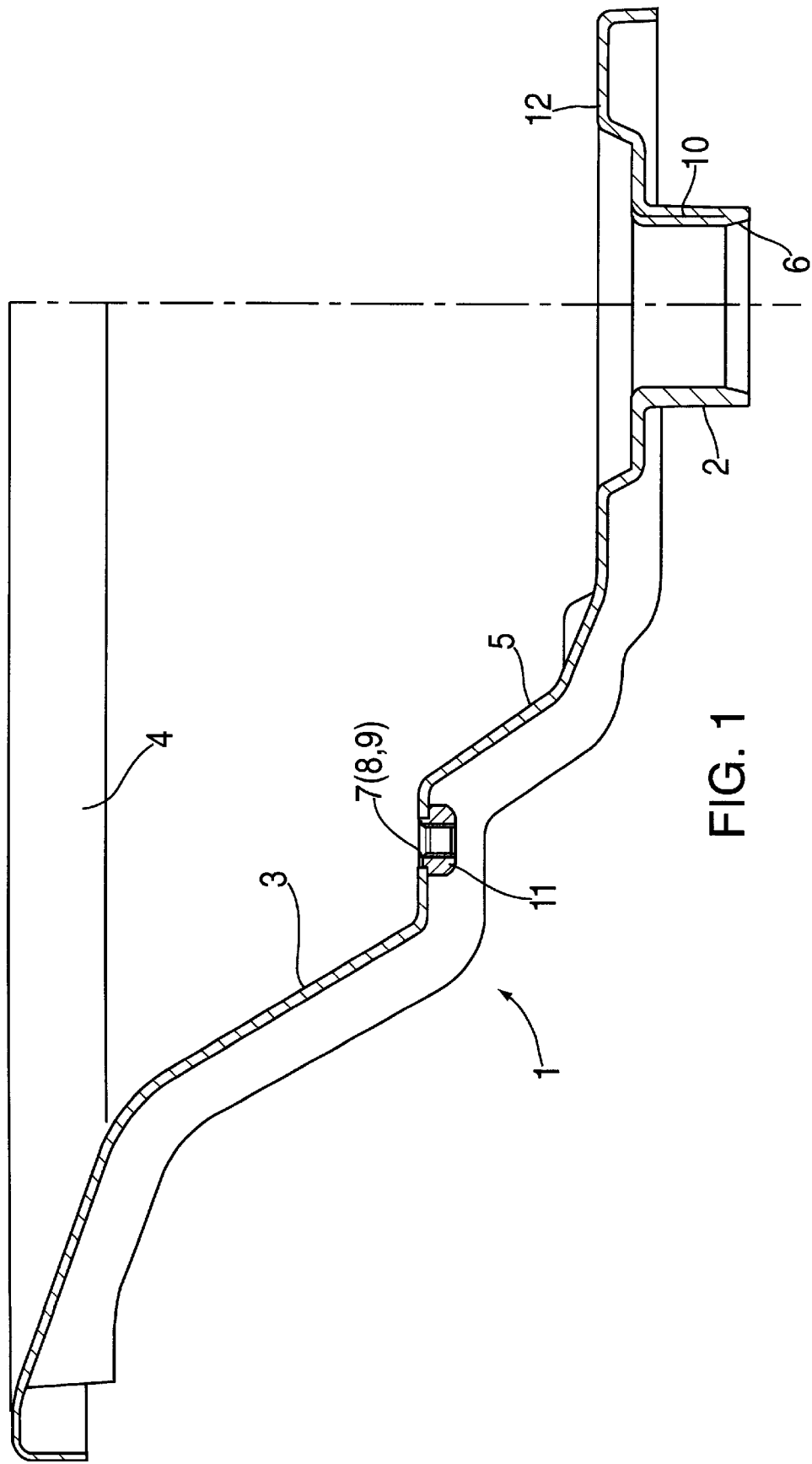

The sheet-steel blank 5 illustrated in FIG. 1 has a hub 2 with two layers 10 of material to make it thick and rigid enough to accept a machined serration. Spokes 3 extend up and out with steps left to accommodate such accessories as an airbag in particular. Since spokes 3 and a rim 4 are U-shaped in section, the dimensions of the section can be varied to provide sheet-steel blank 5 with enough strength without varying its thickness. Assembly has been facilitated by providing hub 2 with a cone 6. One of the steps can be provided with an unthreaded bore 7, a cutout 8 with a nut 11 embedded in it (as illustrated), or a threaded bore 9.

As will be evident from the illustration, the steering-wheel skeleton has essentially been shaped by stamping, punching, and bending parallel to its axis, meaning that all the tools in the production line are oriented in the same direction. This considerably simplifies manufacture, and relatively complicated sheet-metal shapes can be rationally produced. The actual shape can of course be varied to conform to different requirements without involving any other manufacturing principle.

This does not mean, however, that processing in other orientations cannot be included for specific purposes. The outer edge of rim 4 or the right-hand edge of center 12 can be wrapped inward for instance.

Figure 2:
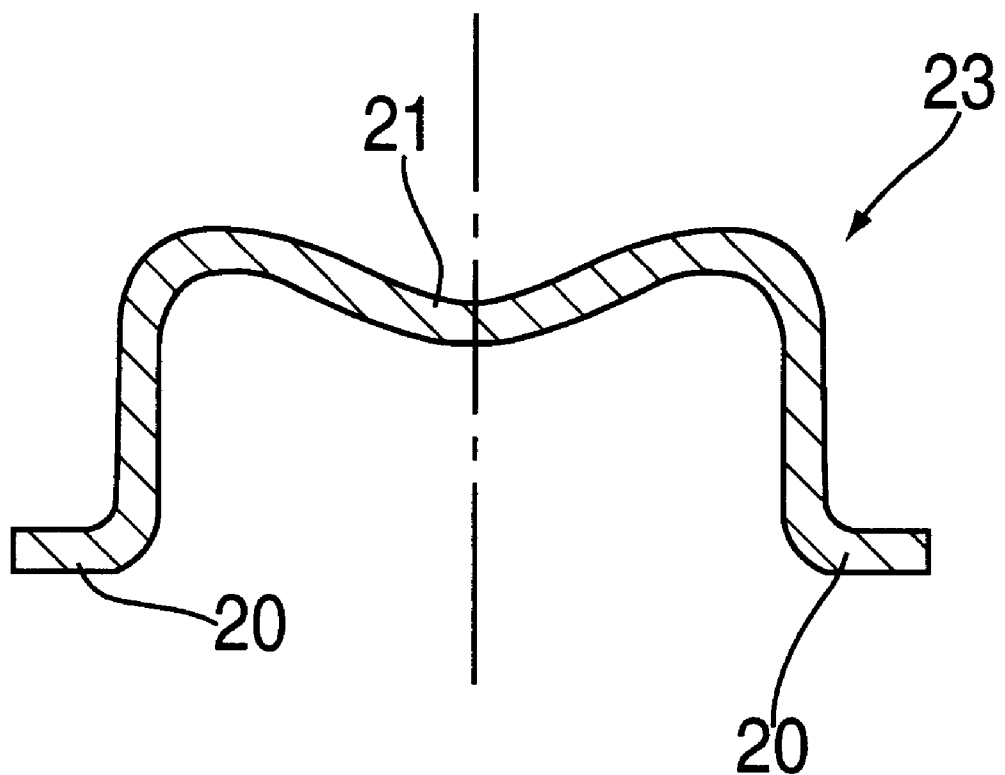

FIG. 2 is a section through one embodiment of a spoke 23. Spoke 23 has been provided with extra rigidity and protected from damage by stamping and bending its edges 20 outward. It is accordingly possible to accommodate the edges essentially away from static or dynamic stress. The curvature in the base 21 of the section allows additional anti-strain hardening there. More room is also left to accommodate the outer layers of the steering wheel.

The major advantage of both embodiments is that the steering-wheel skeleton can be produced in one piece out of a single blank of sheet metal. The final product will accordingly be homogeneous and will satisfy all requirements. It will have no joints that could lead to failure and require extra inspection.

We claim:

1. A steering-wheel skeleton comprising a hub, spokes and a rim, wherein the skeleton consists of one piece made from a single sheet-steel blank by separation and bending without machining and wherein the hub has a tubular shape and is formed with a double-layed structure having two layers contacting each other.

2. The steering wheel according to claim 1, wherein the skeleton is provided with a final shape by a sequence of bending operations.

3. The steering wheel according to claim 1, wherein the skeleton is provided with a final shape by at least one separation operation combined with bending and without machining.

4. The steering wheel according to claim 1, wherein the spokes have equal transverse strength.

5. The steering wheel according to claim 1, wherein the skeleton is partly strengthened by cold material strain hardening.

6. The steering wheel according to claim 1, wherein the skeleton is strengthened in some areas by using two layers of material.

7. The steering wheel according to claim 1, wherein the blank of sheet-steel is 1 to 3 mm thick.

8. The steering wheel according to claim 1, wherein the spokes have a U-shaped cross section with edges bent outwardly and a base bent inwardly.

9. The steering wheel according to claim 1, wherein the hub has a cone with an angle of at least 3°.

\* \* \* \* \*